Patented June 22, 1937

2,084,937

UNITED STATES PATENT OFFICE 2,084,937

PURIFICATION OF TETRACHLOROETHYLENE

Edgar C. Britton, Gerald H. Coleman, and John W. Zemba, Midland, Mich., assignors to The Dow Chemical Company, Midland, Mich., a corporation of Michigan No Drawing. Application April 4, 1935, Serial No. 14,586

12 Claims. (Cl. 260—162)

This invention concerns a method of separating tetrachloroethylene from other chlorinated aliphatic hydrocarbons which are formed along with it in the process of manufacture.

In the known method of preparing tetrachloroethylene by direct chlorination of an olefine chloride, e. g. ethylene or propylene chloride, at high temperature in the presence of a catalyst, there is obtained a liquid mixture of tetrachloroethylene and other chlorinated aliphatic hydrocarbons, e. g. hexachloroethane, pentachloroethane, 1,1,1,2-tetrachloroethane, 1,1,2,2-tetrachloroethane, 1,1,1-trichloroethane, 1,1,2-trichloroethane, etc. The tetrachloroethylene product cannot readily be separated in pure form from such mixture by fractional distillation, due to the tendency for certain amounts of other chlorinated compounds, particularly the tetrachloroethanes and 1,1,2-trichloroethane, to distill along with it. When such crude reaction mixture is distilled, a considerable portion of the tetrachloroethylene is collected in the intermediate fractions and can be recovered only by redistillation. The fraction which is richest in tetrachloroethylene is usually found to possess a low specific gravity due to the inclusion therewith of more or less tetrachloroethane and trichloroethane. Tetrachloroethylene containing such impurities is unsuited to certain purposes, e. g. pharmaceutical uses, for which the pure compound is required. Furthermore, such impurities render the product corrosive to iron and steel equipment in which it may be stored or used.

We have now found that the aforesaid chlorinated hydrocarbon impurities which tend to distill along with the tetrachloroethylene are less stable toward heat than is tetrachloroethylene itself, so that by heating the impure tetrachloroethylene such impurities may be decomposed into hydrogen chloride and lower chlorinated hydrocarbons which are in general more volatile than tetrachloroethylene and can be more readily separated therefrom by distillation. The type of reaction involved in such thermal decomposition of the impurities is illustrated by the following equation for the thermal decomposition of 1,1,2,2-tetrachloroethane:—

(1) $Cl_2HC-CHCl_2 \rightarrow Cl_2C=CHCl + HCl$

In this instance, the decomposition products are gaseous hydrogen chloride and trichloroethylene, the latter having a boiling point of 88° C., which can be readily separated from tetrachloroethylene by fractional distillation.

We have further found that our purification method is particularly advantageous when applied to purifying tetrachloroethylene which is accompanied by pentachloroethane, since the latter is thermally decomposed by heat treatment to form additional tetrachloroethylene, the reaction involved being illustrated by the equation:

(2) $Cl_3C-CHCl_2 \rightarrow Cl_2C=CCl_2 + HCl$

Accordingly, in such case it is possible to recover a greater quantity of tetrachloroethylene than was initially present in the impure material under treatment.

To the accomplishment of the foregoing and related ends, the invention consists in the method hereinafter fully described and particularly pointed out in the claims.

In accordance with the invention tetrachloroethylene containing other chlorinated aliphatic hydrocarbons, e. g. tetrachloroethanes and 1,1,2-trichloroethane, which tend to distill therewith, is heated to a temperature sufficient to decompose such impurities into hydrogen chloride and lower chlorinated hydrocarbons, but below that at which tetrachloroethylene itself undergoes decomposition.

The heating operation is preferably, though not necessarily, carried out at or below atmospheric pressure, since higher pressures tend to retard the splitting out of hydrogen chloride from the impurities. The operation may successfully be carried out in the presence or absence of a catalyst, but the impurities decompose more readily when heated in the presence of a catalyst capable of promoting a splitting out of hydrogen halide from a halogenated aliphatic hydrocarbon. Such catalyst is hereinafter referred to as a dehydrohalogenation catalyst. Although a wide variety of dehydrohalogenation catalysts, e. g. chlorides of zinc, calcium, barium, magnesium, and thalium, oxides of aluminum, silicon, magnesium, titanium, and thorium, etc., are well known and may be used in our process, we find it most advantageous to carry out the operation in the presence of a substantially non-volatile porous surface catalyst. Any substantially non-volatile material having a very fine porous structure may be used as the dehydrohalogenation catalyst, but aluminum oxide, acid activated silica, activated charcoal, and coke, are particularly active catalysts and may be used over long periods of time without losing their catalytic activity.

The temperature to which the impure tetrachloroethylene must be heated in order effectively to decompose the objectionable chlorinated hydrocarbon impurities is dependent upon the presence or absence of a catalyst. In the absence of a catalyst it is usually necessary to heat the crude material to a temperature between about 500° and 800° C. in order to obtain substantial conversion of the impurities into compounds from which the tetrachloroethylene may readily be separated by distillation. When a non-volatile porous surface catalyst is used such result may be obtained by passing vapors of the impure tetrachloroethylene through a bed of the catalyst heated to a temperature above 200° C., preferably above 250° C. In any case, it is merely necessary to heat the impure material to a temperature at which hydrogen chloride is generated.

The vapors issuing from the heating zone are cooled sufficiently to condense the tetrachloroethylene and other chlorinated hydrocarbons contained therein and the residual gaseous hydrogen chloride is passed into a suitable receiver where it is collected. The condensate is fractionally distilled or otherwise treated to separate the tetrachloroethylene in substantially pure form. In case the specific gravity of the product is still below that of pure tetrachloroethylene, said product may be further purified by retreatment in the manner just described. The purified tetrachloroethylene is far less corrosive to iron and steel than is the crude tetrachloroethylene which is contaminated with other chlorinated hydrocarbons of the class hereinbefore mentioned.

The following example illustrates one mode of practicing the invention, but is not to be construed as limiting the invention.

*Example*

Impure tetrachloroethylene, containing a considerable amount of tetrachloroethanes, 1,1,2-trichloroethane, and other chlorinated aliphatic hydrocarbons and having the specific gravity 1.6016 at 20°/4° C., was dropped at a rate of 320 grams per hour into a vertical tube 3 feet long and of 1 inch diameter filled with alternate layers of broken glass tubing and granular kaolin and maintained at approximately 350° C. The incoming tetrachloroethylene was thereby vaporized and the vapors passed downwardly through the alternate layers of glass tubing and catalyst. The vapors issuing from the heated chamber were cooled to condense the chlorinated hydrocarbons contained therein. From 320 grams of crude tetrachloroethylene so-treated there was recovered 310 grams of condensate, which was then fractionally distilled at atmospheric pressure. There was collected 252 grams of purified tetrachloroethylene distilling at 118°–120.5° C., and having a specific gravity 1.6230 at 20°/4° C. and index of refraction $$n_D^{20} = 1.5058$$

By similar procedure we have also successfully employed alumina, silica gel, activated charcoal, pumice, and magnesia brick as dehydrohalogenation catalysts in purifying tetrachloroethylene.

Following the hereinbefore described heat treatment of crude tetrachloroethylene, pure tetrachloroethylene may sometimes be separated from the pyrolyzed mixture in other ways than by fractional distillation. For instance, by such heat treatment of impure tetrachloroethylene containing trichloroethane a mixture of tetrachloroethylene and 1,1-dichloroethylene may be obtained. The 1,1-dichloroethylene may be polymerized to a solid either by heating the pyrolyzed mixture or permitting the latter to stand, and the purified tetrachloroethylene may then be separated by filtration or decantation.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of purifying tetrachloroethylene containing other chlorinated aliphatic hydrocarbons which tend to distill therewith, the step which consists in heating the impure tetrachloroethylene to a temperature sufficient substantially to decompose said impurites with formation of hydrogen chloride therefrom.

2. In a method of purifying tetrachloroethylene containing other chlorinated aliphatic hydrocarbons which tend to distill therewith, the steps which consist in passing vapors of the impure tetrachloroethylene through a zone heated to a temperature sufficient to decompose said impurities with formation of hydrogen chloride therefrom, but below that at which tetrachloroethylene undergoes appreciable decomposition, cooling the vapors issuing from such zone sufficiently to condense tetrachloroethylene therefrom, and thereafter separating tetrachloroethylene from the condensate.

3. In a method of purifying tetrachloroethylene containing as an impurity another chlorinated aliphatic hydrocarbon which tends to distill therewith, the step which consists in heating the impure tetrachloroethylene to a temperature between about 200° and about 800° C. to decompose said impurity with formation of hydrogen chloride therefrom.

4. In a method of purifying tetrachloroethylene containing as an impurity another chlorinated aliphatic hydrocarbon which tends to distill therewith, the step which consists in heating the impure tetrachloroethylene to a temperature between about 200° and about 800° C. in the presence of a dehydrohalogenation catalyst to decompose said impurity with formation of hydrogen chloride therefrom.

5. In a method of purifying tetrachloroethylene containing as an impurity another chlorinated aliphatic hydrocarbon which tends to distill therewith, the step which consists in contacting vapors of the impure tetrachloroethylene with a substantially non-volatile porous surface catalyst heated to a temperature between about 200° and about 800° C. to decompose said impurity with formation of hydrogen chloride therefrom.

6. In a method of purifying tetrachloroethylene containing as an impurity another chlorinated aliphatic hydrocarbon which tends to distill therewith, the step which consists in contacting vapors of the impure tetrachloroethylene with alumina at a temperature between about 200° and about 800° C. to decompose said impurity with formation of hydrogen chloride therefrom.

7. In a method of purifying tetrachloroethylene containing as an impurity another chlorinated aliphatic hydrocarbon which tends to distill therewith, the step which consists in contacting vapors of the impure tetrachloroethylene with a siliceous catalyst at a temperature between about 200° and about 800° C. to decompose said impurity with formation of hydrogen chloride therefrom.

8. In a method of purifying tetrachloroethylene containing as an impurity another chlorinated aliphatic hydrocarbon which tends to distill therewith, the step which consists in contacting vapors of the impure tetrachloroethylene with carbon at a temperature between about 200° and about 800° C. to decompose said impurity with formation of hydrogen chloride therefrom.

9. In a method of purifying tetrachloroethylene containing as an impurity another chlorinated aliphatic hydrocarbon which tends to distill therewith, the steps which consist in passing vapors of the impure tetrachloroethylene through a bed of a substantially non-volatile porous surface catalyst heated to a temperature between about 250° and about 800° C., whereby said impurity is decomposed with formation of hydrogen chloride, thereafter cooling the vapors sufficiently to condense tetrachloroethylene therefrom, and fractionally distilling the condensate to separate the tetrachloroethylene in purified form.

10. In a method of purifying tetrachloroethylene containing as an impurity another chlorinated aliphatic hydrocarbon which tends to distill therewith, the steps which consist in passing the impure tetrachloroethylene through a bed of alumina heated to a temperature between about 250° and about 800° C., whereby said impurity is decomposed with formation of hydrogen chloride, thereafter cooling the vapors sufficiently to condense tetrachloroethylene therefrom, and fractionally distilling the condensate to separate the tetrachloroethylene in purified form.

11. In a method of purifying tetrachloroethylene containing as an impurity another chlorinated aliphatic hydrocarbon which tends to distill therewith, the steps which consist in passing the impure tetrachloroethylene through a bed of a siliceous catalyst heated to a temperature between about 250° and about 800° C., whereby said impurity is decomposed with formation of hydrogen chloride, thereafter cooling the vapors sufficiently to condense tetrachloroethylene therefrom, and fractionally distilling the condensate to separate the tetrachloroethylene in purified form.

12. In a method of purifying tetrachloroethylene containing as an impurity another chlorinated aliphatic hydrocarbon which tends to distill therewith, the steps which consist in passing the impure tetrachloroethylene through a bed of carbon heated to a temperature between about 250° and about 800° C., whereby said impurity is decomposed with formation of hydrogen chloride, thereafter cooling the vapors sufficiently to condense tetrachloroethylene therefrom, and fractionally distilling the condensate to separate the tetrachloroethylene in purified form.

EDGAR C. BRITTON.
GERALD H. COLEMAN.
JOHN W. ZEMBA.